US008733523B2

(12) United States Patent
Pamminger et al.

(10) Patent No.: US 8,733,523 B2
(45) Date of Patent: May 27, 2014

(54) POWER ASSIST ELEMENT (75) Inventors: Helmut Pamminger, Voecklabruck (AT); Alexander Mueller, Altmuenster (AT)

(73) Assignee: Miba Sinter Austria GmbH, Laakirchen (AT)

( * ) Notice: Subject to any disclaimer, the term of this patent is extended or adjusted under 35 U.S.C. 154(b) by 670 days.

(21) Appl. No.: 12/734,945

(22) PCT Filed: Dec. 17, 2008

(86) PCT No.: PCT/AT2008/000456
§ 371 (c)(1),
(2), (4) Date: Jun. 4, 2010

(87) PCT Pub. No.: WO2009/076691
PCT Pub. Date: Jun. 25, 2009

(65) Prior Publication Data
US 2010/0263979 A1 Oct. 21, 2010

(30) Foreign Application Priority Data

Dec. 18, 2007 (AT) ................................ A 2051/2007

(51) Int. Cl.
*F16D 23/06* (2006.01)
(52) U.S. Cl.
USPC ................. 192/53.31; 192/54.32; 192/54.341
(58) Field of Classification Search
CPC .......................... F16D 23/06; F16D 2023/0618
USPC .......... 192/53.1, 53.2, 53.34, 53.341, 53.342, 192/53.31, 53.32, 48.91, 53.3; 74/339
See application file for complete search history.

(56) References Cited

U.S. PATENT DOCUMENTS

| 3,197,000 | A | * | 7/1965 | Conkle | 192/53.343 |
| 3,548,983 | A | * | 12/1970 | Hiraiwa | 192/53.341 |
| 4,805,755 | A | * | 2/1989 | Fukumoto et al. | 192/53.32 |
| 5,113,985 | A | * | 5/1992 | Frost | 192/53.341 |
| 5,664,654 | A | | 9/1997 | Braun | |
| 6,467,597 | B1 | | 10/2002 | Fernandez | |
| 7,717,246 | B2 | * | 5/2010 | Hiraiwa | 192/53.31 |

(Continued)

FOREIGN PATENT DOCUMENTS

| DE | 2 243 522 | 4/1973 |
| DE | 34 45 144 | 6/1985 |
| DE | 44 44 380 | 6/1996 |
| DE | 694 06 413 | 5/1998 |
| DE | 696 17 821 | 8/2002 |
| DE | 600 07 820 | 11/2004 |

(Continued)

*Primary Examiner* — David D Le
*Assistant Examiner* — Terry Chau
(74) *Attorney, Agent, or Firm* — Collard & Roe, P.C.

(57) ABSTRACT

The invention relates to a power assist element (11) for arranging in a synchronization hub (2) of a gear-synchronization device (1), with a basic body (17), which has a height (18), a longitudinal extension (19) and a width extension (20), wherein the longitudinal extension is arranged in the installed state in the circumferential direction of the synchronization hub (2), and which in the direction of the longitudinal extension (19) has two opposite distal end sections (21), on which respectively a functional face (22) is formed, which in the installed state cooperate with the synchronization hub (2). The functional faces (22) are inclined in opposite direction and relative to the longitudinal extension (19) or are designed to be offset relative to one another along a longitudinal middle axis (37) in the direction of the longitudinal extension (19) of the basic body (17), wherein the functional faces (22) are oriented respectively at an acute angle (23) to the greatest longitudinal extension (19) of the basic body (11).

8 Claims, 6 Drawing Sheets

(56) References Cited

U.S. PATENT DOCUMENTS

| | | | |
|---|---|---|---|
| 7,753,185 B2* | 7/2010 | Hiraiwa | 192/53.31 |
| 8,528,435 B2* | 9/2013 | Hackl et al. | 74/339 |
| 2003/0006116 A1* | 1/2003 | Jackson | 192/53.31 |
| 2007/0199786 A1* | 8/2007 | Hiraiwa | 192/53.34 |
| 2008/0066568 A1* | 3/2008 | Hackl et al. | 74/339 |

FOREIGN PATENT DOCUMENTS

| | | |
|---|---|---|
| EP | 0 754 874 | 1/1997 |
| EP | 1 750 025 | 2/2007 |
| JP | 2005-291423 | 10/2005 |
| WO | WO 03/004892 | 1/2003 |
| WO | WO 2005/103520 | 11/2005 |

* cited by examiner

POWER ASSIST ELEMENT

CROSS REFERENCE TO RELATED APPLICATIONS

This application is the National Stage of PCT/AT2008/000456 filed on Dec. 17, 2008, which claims priority under 35 U.S.C. §119 of Austrian Application No. A 2051/2007 filed on Dec. 18, 2007. The international application under PCT article 21(2) was not published in English.

The invention relates to a power assist element for arrangement in a hub of a gear synchronisation device, comprising a basic body, which has a height and—as viewed in plan view—a longitudinal extension and width extension, wherein the longitudinal extension is arranged in the installed state in the circumferential direction of the synchronisation hub, and which comprises two distal end sections lying opposite one another in the direction of the longitudinal extension, on which respectively one functional face is formed, which in the installed state cooperate with the synchronisation hub, a synchronisation hub with a sleeve toothing, which extends over a portion of an outer circumference and is interrupted by recesses, which is arranged for mounting power assist elements, and a gear-synchronisation device with at least one synchronisation hub arranged on a shaft, on which hub lying opposite in axial direction at least one synchronisation ring is arranged, at least one gear wheel arranged on the shaft, at least one friction package, which is arranged upright underneath the synchronisation ring and is in active connection with the latter, and with at least on slip coupling arranged over the hub, wherein between the gear wheel and the synchronisation ring a coupling body is arranged and wherein the synchronisation hub comprises at least one recess in which at least one spring-loaded power assist element is arranged.

In current, European mass-produced gears mainly of the Borg Warner type synchronisations are mainly used. Such gears usually comprise for each gear to be shifted an idler gear, a coupling body with a shift toothing and friction cone and a synchronisation ring with counter cone and locking toothing and also a synchronisation hub with insertion toothing and sleeve toothing. In said synchronisation hub spring-loaded pressure pieces are arranged. By means of a slip coupling with shift toothing and internal toothing for presynchronisation the latter is displaced by the shifting force together with the spring-loaded pressure pieces in the direction of the gear wheel to be shifted, so that the conical faces of the synchronisation ring and synchronisation cone are pressed onto one another by the pressure pieces. The synchronisation ring is rotated in the synchronisation hub by the friction torque within the scope of tangential play, so that the gearing of the ring and slip coupling are displaced by a half toothing width against one another. If the shifting force is now greater than the presynchronisation force, which is dependent on the pretensioning of the compression springs of the pressure pieces, the slip coupling moves up to the locking toothing on the synchronisation ring and the toothing of the slip coupling contact one another. As long as the locking torque resulting from the friction between the conical faces and the friction on the locking toothing is greater than the restoring moment created by the ramp angle on the toothing, there is no further axial displacement of the slip coupling. The motor-side gear elements are accelerated or delayed by the frictional torque and the main synchronisation takes place in this way. During the synchronous operation of the synchronisation ring and synchronisation cone the locking torque is almost zero, so that the locking toothing on the synchronisation ring causes a rotation of the synchronisation ring until the tooth and toothing spacing lie opposite one another. The toothing of the slip coupling slides through the locking toothing of the synchronisation ring. Then the toothing of the slip coupling with the ramps slides on the coupling toothing on the synchronisation cone and rotates the coupling bodies together with the idler gear until the tooth and tooth space lie opposite one another and the form-closed connection between the drive shaft and idler gear can be formed.

To reduce the shifting force to be used in the prior art already several modifications of said Borg Warner systems have been described.

Thus it is known from DE 696 17 821 T2 to arrange an amplifying mechanism between the synchronisation hub and a synchronisation ring, which amplifying mechanism is positioned so that it receives a pressure force, which is caused by the movement of the slip coupling to the corresponding speed changing gear wheel, and in this way amplifies and transmits the pressing force to the synchronisation ring. The amplifying mechanism consists of a pair of levers which are divided on at least two sections in circumferential direction and comprise a plurality of lever heads. The lever heads have a bevelled edge, which forms an engagement position for receiving the axial pressing force, which is created by direct contact in connection with the movement of the slip coupling, and for breaking down the relevant pressure force into a radial component force, which is directed to the centre and forms an axial component force. The axial component force is created, when a bevelled edge provided on the inner circumferential wedge toothing of the slip coupling is pressed against the bevelled edge of the lever head.

The option of amplifying power via oblique surfaces is documented in principle in the prior art. Thus for example DE 22 43 522 A describes the possibility of amplifying power, in that on the synchronisation ring a knobbly device with two oblique surfaces is provided, which cooperates with a counter-knobbly device of the hub. In this embodiment the straight end face acts against a rectangular pressure piece.

EP 1 750 025 A2 describes for power amplification a further modification of the pressure pieces. The latter are—as seen in plan view—designed to be H-shaped. The end sections of such an H-shaped pressure piece are provided with a cross sectional extension, wherein the transitions between the main part of the pressure piece to the end sections are provided with oblique surfaces, which are designed to be inclined in the direction of the middle point. The synchronous hub also comprises for this in the recesses provided for mounting the pressure pieces bevelling which is complementary to the oblique surfaces of the pressure piece.

The objective of the present invention is to create a power assist element for a gear-synchronisation device or a synchronisation hub for the power assist element and to provide a gear-synchronisation device.

Said objective of the invention is achieved by means of the aforementioned power assist element, in which the functional faces are designed to be inclined towards one another, in particular diametrically opposite one another and inclined against the longitudinal extension, or in that the two functional faces are offset along a longitudinal middle axis in the direction of the longitudinal extension of the basic body and are preferably designed to be at least almost parallel to one another, whereby the functional faces are oriented respectively at an acute angle to the greatest longitudinal extension of the basic body, by the aforementioned synchronization hub, in which a cross section of the recesses below the sleeve toothing increases, so that the sleeve toothing extends partly into the area above the power assist element arranged in the recesses and by the design of a gear-synchronization device with said power assist element.

In addition to the known advantages of such power assist elements, such as for example the improved shifting comfort compared to Borg-Warner synchronisations, the power assist element according to the invention has the advantage that wear in the friction package of the gear-synchronisation device does not influence or not substantially the power amplification, as is the case e.g. with the aforementioned H-shaped power assist element. By means of the wear of the friction package in gear synchronisations according to the prior art the rotation becomes greater, so that the relative position of the locking toothing of the synchronisation ring to the slip coupling changes. By means of the power assist element according to the invention in addition more power can be transmitted with at least the same uniform shifting comfort. Thus also more rapid synchronisation cycles are possible. In addition, by means of the possible reduction of a triple cone design of the synchronisation on a double cone design a reduction in the component size is possible or with an identical component size as in the prior art the transmission of greater output is possible. The power assist element can be designed as a sintered component, so that the manufacturing costs can be reduced and also power assist elements can be made more economically with a more complex geometry. In this way the design option with a larger area—in particular—compared to an H-piece from the prior art—has proved advantageous, as in this way the loading and thereby the wear of the power assist element can be lower, so that if necessary additional strength-increasing measures, such as e.g. heat treatment or hardening can be dispensed with, whereby as a result the production of the power assist element becomes simpler. By means of the design with offset and preferably at least approximately parallel functional faces a power assist element can be made available, which can operate in both shifting directions. By means of the synchronisation hub according to the invention, on the one hand the number of teeth in the sleeve toothing can be increased, whereby the mechanism of the synchronisation hub can be improved, and on the other hand the power assist element projects only partly outwardly in radial direction, in other words the power assist element can be held more effectively.

To increase the frictional torque of the friction packet of the gear-synchronisation device consisting of an inner and outer cone ring or also to increase the axial power, i.e. the pressing force, it is an advantage if the functional faces are inclined relative to the longitudinal extension of the basic body at an angle with an absolute value selected from a range with a lower limit of 10° and an upper limit of 89°.

The functional faces can also be inclined relative to the longitudinal extension of the basic body at an angle with an absolute value selected from a range with a lower limit of 25° and an upper limit of 70° or selected from a range with a lower limit of 45° and an upper limit of 60°.

With regard to the angle it should be noted that as in principle only one functional face is required for a shifting direction, the angles of both functional areas can also be different, i.e. also symmetrical embodiments of the power assist element are possible.

The surface pressure of the amplification can also be improved in that the functional areas each have a size which is selected from a range with a lower limit of 10 $mm^2$ and upper limit of 60 $mm^2$. In addition, the pressure distribution can be influenced positively in this way.

The functional areas can also have a size which is selected from a range with a lower limit of 30 $mm^2$ and an upper limit of 50 $mm^2$, or is selected from a range with a lower limit of 35 $mm^2$ and an upper limit of 40 $mm^2$.

It is also possible for a cross section of the basic body to be designed to be at least approximately u-shaped in the direction of the elevation, whereby the power assist element can be fitted more easily into the hub.

Furthermore, the central area of the basic body can be designed to be elevated, so that the power assist element can be arranged with this central area in the corresponding recess of the synchronisation hub—without projecting over the latter—and the two oblique functional faces are covered in axial direction by the circumferential surface of the hub. The synchronisation hub can thus comprise more teeth.

To increase the functional safety of the shifting operation it is an advantage, if at least one of the edges of the functional areas is interrupted in the direction of the height, as in this way the engagement of the complementary functional area of the respective synchronisation ring can be performed more easily. In addition, a simpler power-assist element is possible in this way.

According a further embodiment variant of the invention on the distal end sections of the basic body of the power-assist element opposite one another in longitudinal extension a circular ring section-shaped lever element is arranged, so that in addition to the power amplification via the oblique plane in addition power amplification is possible owing to the lever effect of said lever elements.

Lastly, it is possible that the lever elements on the functional faces facing the hub in the region of ends averted from the basic body have at least approximately bead-like projections, whereby the lever effect is improved and the tilting of the lever elements is simplified with force loading.

The recess of the synchronisation hub in the region of the sleeve toothing for a wear-independent amplifying mechanism can comprise a fixed stop for a synchronisation ring.

Furthermore, in the recess of the synchronisation hub ramps with functional faces can be arranged and the sleeve toothing extends over said ramps—as seen in circumferential direction—whereby preferably the functional faces are formed on an annular, interrupted web.

The power assist element can be designed to bear in a non-engaging manner on the synchronous ring in the gear-synchronisation device. The synchronisation ring therefore does not need to comprise any flange elements for the power assist element and for the inner friction ring, such as e.g. corresponding recesses or free spaces, as is the case according to the prior art, by means of which the synchronisation ring can be designed to have a simpler geometry and thus can be produced more easily.

For a better understanding of the invention the latter is explained in more detail with reference to the following figures.

In a much simplified schematic view.

First of all, it should be noted that in the variously described exemplary embodiments the same parts have been given the same reference numerals and the same component names, whereby the disclosures contained throughout the entire description can be applied to the same parts with the same reference numerals and same component names. Also details relating to position used in the description, such as e.g. top, bottom, side etc. relate to the currently described and represented figure and in case of a change in position should be adjusted to the new position.

All of the details relating to value ranges in the present description are defined such that the latter include any and all part ranges, e.g. a range of 1 to 10 means that all part ranges, starting from the lower limit of 1 to the upper limit 10 are included, i.e. the whole part range beginning with a lower limit of 1 or above and ending at an upper limit of 10 or less, e.g. 1 to 1.7, or 3.2 to 8.1 or 5.5 to 10.

Figure 1:
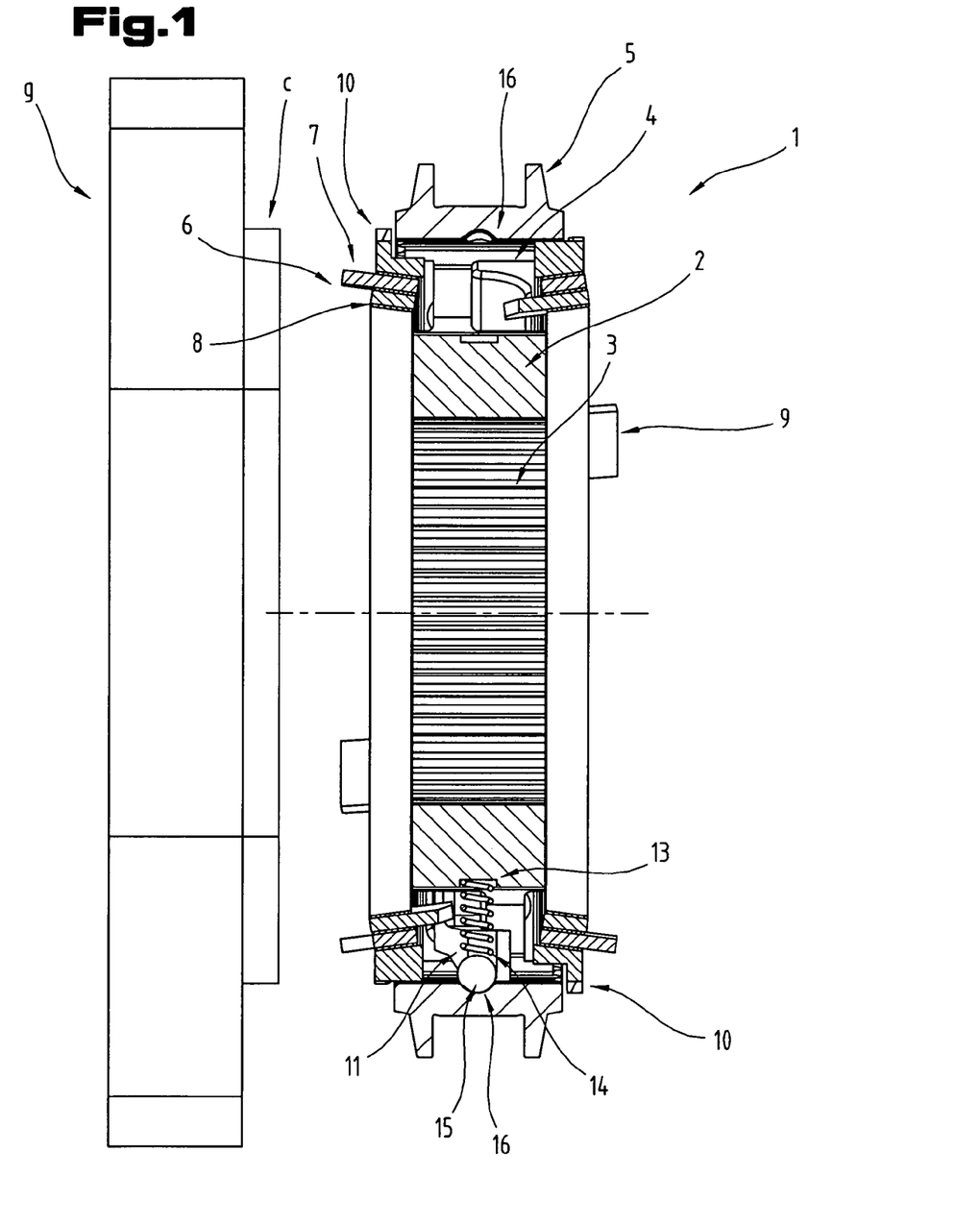
FIG. 1 shows a cut-out of a gear synchronisation device in axial section.

FIG. 1 shows an axial section of a cut-out of a gear synchronisation device 1. As said gear gear synchronisation device 1 is similar to the Borg-Warner type, and the latter is described sufficiently in the relevant literature and is known to a person skilled in the art, there is no need to discuss the principle of its functioning here.

Said gear-synchronisation device 1 is set up in this embodiment to couple in a rotation-fast manner two adjacent idler gears, i.e. gearwheels (not shown) alternately to a shaft (not shown) or release them from the latter.

Within the scope of the invention it is also possible to design a one-sided synchronisation device, so that only one idler gear and the associated component group parts, such as friction package, synchronisation ring, coupling body etc., can also only be provided once.

The gear-synchronisation device 1 comprises a synchronisation hub 2 with an inner insertion toothing 3 for the non-rotational connection of the synchronisation hub 2 with the shaft, as well as an outer sleeve toothing 4. The synchronisation hub 2 is arranged by conventional means axially non-displaceably on the shaft. On the synchronisation hub 2 a slip coupling 5 is mounted to be non-rotatable, but axially displaceable. The latter can thus be activated by a gear-shift fork (not shown).

Furthermore, the gear-synchronisation device 1 for each shifting direction comprises a friction package 6 consisting at least of an outer cone ring 7 and an inner cone ring 8, wherein on the cone rings 7, 8 on the corresponding cooperating surfaces conventional friction linings are provided. The external cone ring 7 comprises at least one projection 9, which is connected in rotational direction in a form-closed manner to a coupling body c. The coupling body c is connected in a non-rotational manner with the respective idler gear, i.e. the gear wheel g. For example, the coupling body c can sit on a cone of the idler gear in a non-rotatable manner, whereby on the coupling body c corresponding free spaces can be provided and on the cone of the idler gear complementary cams can be provided.

Furthermore, it is possible that the gear wheel g comprises for example a cone with an end toothing and the coupling body c comprises a correspondingly fitting end toothing, whereby the non-rotational arrangement of the coupling body c on the gear wheel g is made possible.

Radially outside and above the friction package 6 a synchronisation ring 10 is arranged on both sides of the synchronisation hub 2.

Between the synchronisation hub 2 and the slip coupling 5 on the one hand and in axial direction between the friction packages 6 on the other hand at least one power assist element 11 is arranged, such that the latter is pretensioned by a spring element 12, which is arranged in a recess 13, in particular a blind bore, of the synchronisation hub 2 on the one hand and a recess 14 in the power assist element 11 on the other hand, against the slip coupling 5 via a ball 15 arranged on a side of the power assist element 11 opposite the spring element 12, which ball in turn is arranged in a further recess 14, in particular a blind bore, on the one hand and on the other hand in a recess 16 on the underside of the slip coupling 5, which faces the synchronisation hub 2. The recess 14 can also be designed to be continuous by the power assist element. Instead of a ball by means of a suitable adaptation of the mount thereof a roller or in general a roller body can be used. It is also possible to omit the spring tensioning and to position the power assist element 11 by means of the centrifugal forces occurring during the operation of the gear-synchronisation device.

The spring element 12 can be designed in the shown exemplary embodiment as a spiral spring, likewise with a slight adaptation a diaphragm spring element, an annular spring or a pneumatic spring can be used.

The frictional torque in the friction packets 6 during the shifting operation is determined by the spring constant of the spring element 12.

Of course, it is possible within the scope of the invention that distributed over the circumference of the synchronisation hub 2 several of said spring elements 12 are arranged in the gear-synchronisation device 1, in particular two or three per shifting direction or synchronisation direction.

The power assist element 11 represents the core of the invention. By means of the latter a circumferential force bearing on the power assist element 11, which is caused by the frictional torque on the friction package 6 during the synchronisation operation, is converted into an additional axial force and thus power amplification is achieved. An essential feature of this power assist element 11 is a wear-independent amplifying mechanism, i.e. a larger axial movement resulting from the wear in the friction package 6 does not affect the amplifying mechanism. There is thus no change in the position of the locking toothing/slip coupling, as is the case e.g. in the H-shaped pressure piece known from the prior art, in which the contact point moves outwards and thus the synchronisation position is displaced further and further in circumferential direction. In the invention the latter is achieved by a fixed stop of the synchronisation ring 10 in the recess in the synchronisation hub 2, which mounts the power assist element 11. The power assist element 11 of this first embodiment variant can best be seen in FIGS. 3 to 5, which show different views of the power assist element 11.

Figure 3:
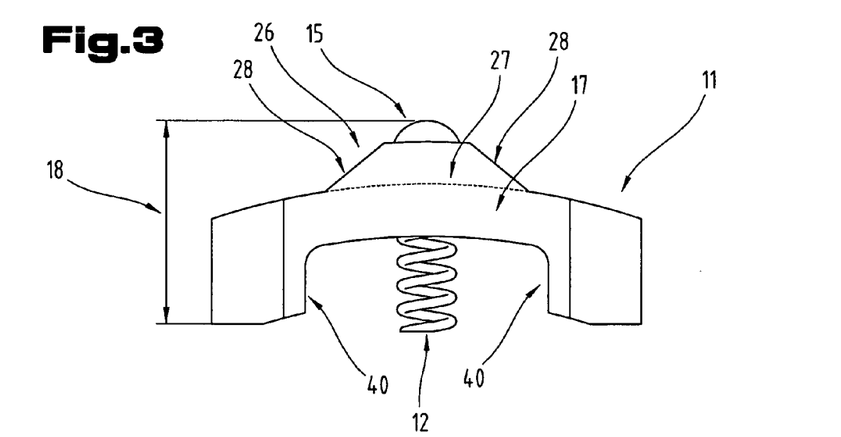
FIG. 3 shows a first embodiment variant of a power assist element in side view.

As can be seem from FIG. 3, in this embodiment variant the power assist element 11 in side view has an almost u-shaped cross section. Centrally, i.e. between the two arms of said profile cross section the spring element 12 and the ball 15 are arranged as described above.

The power assist element 11 comprises a basic body 17, which has an elevation 18, a longitudinal extension 19 and width extension 20. In the direction of the longitudinal extension 19 of opposite distal end sections 21 an oblique functional face 22 is designed such that the latter is arranged perpendicularly on a cross sectional plane defined by the longitudinal extension 19 and the width extension 20. According to the invention said functional faces 22 are arranged to be inclined in opposite direction, preferably diametrically opposite to the longitudinal extension 19, (asymmetrical designs are also possible within the scope of the invention with respect to the angle), wherein the functional faces 22 are oriented respectively at an acute angle 23 to the greatest longitudinal extension of the basic body 17. In this case this greatest longitudinal extension of the basic body 17 is formed on the rear side rs of the power assist element 11, which bears partly next to a cam-like projection 24—in radial direction—of the synchronization ring 10, as shown best in FIG. 2. In other words the functional faces 22 run obliquely to the rotational plane of the synchronization ring 10.

However, at least one of the functional faces 22 need not necessarily be perpendicular to the said cross sectional plane, but can also be arranged at an angle to the latter, i.e. obliquely to the latter. The angle can be selected from a range with a lower limit of 1° and an upper limit of 75°, or from a range with a lower limit of 10° and an upper limit of 65°, or from a range with a lower limit of 15° and an upper limit of 55°.

The power assist element 11 engages with the end face of the synchronization ring 10, which points in the direction of the synchronization hub 2. By means of the free space in the power assist element 11 in the region of the synchronization ring, the power assist element 11 has two bearing faces on the synchronization ring 10. This has the particular advantage that when there are several power assist elements 11 over the circumference of the synchronization hub 2 improved power distribution is made possible. For example, with three power assist elements 11 six engagement and functional faces are obtained. In particular, the engagement surface lies at least approximately at the same height or in the same plane, on which or in which the pressing force is exerted on the oblique plane or ramp in the synchronization hub 2, and thus no additional torque is transmitted and tilting can be prevented. The contact face or the contact point is represented schematically in FIG. 6 by a double arrow.

The cam-like projection 24 cooperates with the fixed stop of the synchronisation hub 2, as described above, and thus limits its mobility in circumferential direction.

It is known that the synchronisation hub 2 comprises on its outer circumference, i.e. in the region of the sleeve toothing 4 distributed around the circumference, several recesses 25, in which the cam-like projections of the synchronisation rings 10 engage, so that also the power assist element or elements 11 is arranged at least partly in said recesses 25. For this the power assist element 11 comprises in a central area 26 in this embodiment variant, i.e. in the region of the base of the u-shaped cross section, an elevation 27 which projects at least partly into said recess 25 (in radial direction) and is mounted by the latter.

The elevation 27 in this embodiment is designed to be trapezoidal in cross section in particular with ramps 28 falling obliquely diametrically opposite one another in the direction of the distal functional faces 22. However, it is also possible for this cross-sectional shape of the elevation 27 to be changed within the scope of the invention, for example the latter may be formed by a web-like elevation of the central area 26. The width in longitudinal extension 19 of said elevation 27 is such that the power assist element 11 with the elevation can be arranged in the recess 25 of the synchronous hub 2. By designing this elevation 27 to have a trapezoidal cross section the relative adjustability of the power assist element 11 to the synchronisation hub 2, i.e. the arrangement of the power assist element 11 in the recess 25, is simplified.

The height of said elevation 27 corresponds at least approximately to the toothing height of the synchronisation hub 2.

The angle 23, at which the functional faces 22 run to the greatest longitudinal extension 19 of the power assist element 11, has in this embodiment variant of the power assist element 11 an absolute value of 60°. In general, this angle can also be selected within the scope of the invention from the aforementioned ranges.

Furthermore, the functional faces 22 have a size of about 38 mm². The latter can also be selected in general within the scope of the invention from one of the aforementioned ranges.

Although the flat bearing of the functional faces 22 on the corresponding ramps of the synchronisation hub 2 is the preferred design, it is also possible within the scope of the invention to provide a point-like bearing or linear bearing of the functional faces 22 on the ramps, in particular if by means of a tilting movement of the power assist element 11 an additional power amplification is to be performed. For this either the ramps in the synchronisation hub 2 or the functional faces 22 can be designed to be curved.

Figure 4:
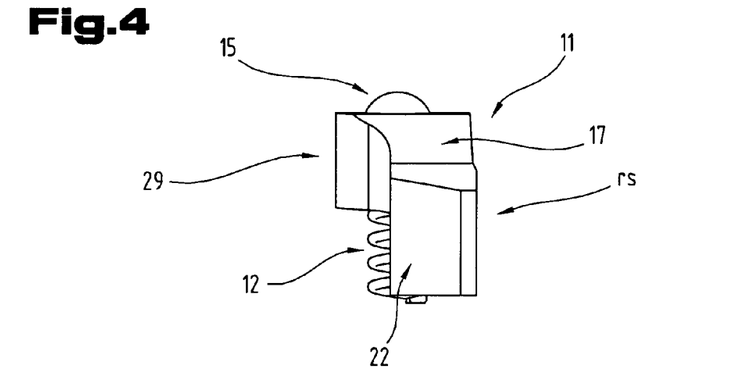
FIG. 4 shows the power assist element according to FIG. 3 in front view.

As shown in particular in FIG. 4, said functional faces 22 do not necessarily need to be quadratic or rectangular, but owing to the obliquely downwards directed side areas the base of the u-shaped cross section, as shown in particular in FIG. 3, can also have a different cross sectional shape.

Figure 5:
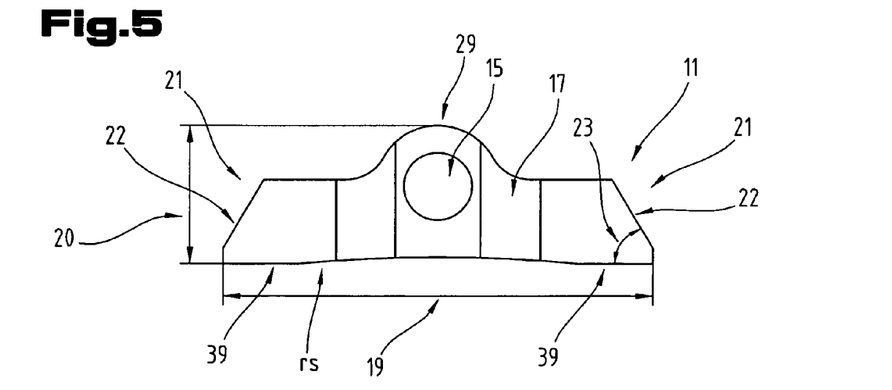
FIG. 5 shows the power assist element according to FIG. 3 in plan view.

The edge, which is formed between the functional face 22 and the greatest longitudinal extension 19 of the basic body 17, can be designed to be interrupted, as can be seen in particular in FIG. 4 or FIG. 5.

A front facing end face 29 of the power assist element 11, i.e. the end face 29 pointing in the direction of the intersecting edge formed in the imagined extension of the functional faces 22 through the latter, is designed to be rounded. In a modification of this it is also possible that said end face 29 is designed to be substantially planar and for this transitional areas to adjoining faces are provided with rounded parts.

By means of said rounded end face 29 or the rounded faces the ball 15 is mounted better in the power assist element 11.

The synchronisation hub 2 comprises underneath the sleeve toothing 4 and above the insertion toothing 3 in the recess 25 to the functional faces 22 at least almost complementary oblique functional faces 30, i.e. the already mentioned ramps (FIG. 2), which if necessary can be designed to be rounded, wherein the sleeve toothing 4 extends over said oblique functional faces 30 in circumferential direction. In addition, the synchronisation hub 2 comprises an annular web 31 (FIG. 6) extending in circumferential direction, on which said functional faces 30 are formed. The spacing in circumferential direction between the two functional faces 30 is such that the power assist element 11 can be arranged with play between the functional faces 22 and functional faces 30, i.e. its rotation or axial displacement is possible in the recess 25, or the power assist element 11 in neutral position bears against said functional faces 30 and during the synchronisation slides on the latter. By means of the rotation or axial displacement of the power assist element 11, caused by the displacement of the slip coupling 5 and the coupling with the inner cone ring 8, by means of the oblique functional faces 22 a servo-power additional to the axial force is generated due to the shifting power via the gear-shift fork, which engages into the slip coupling 5, and in this way power amplification is produced. Said power amplification is thus independent of the wear in the friction packages 6, as already explained above.

In the gear-synchronisation device 1 according to the invention the coupling of the inner cone ring 8, i.e. the friction ring, is made not to the synchronisation ring 10 but to the power assist element 11, so that the synchronisation ring 10 can be designed to have a simpler structure. The synchronisation ring 10 unlike the synchronisation ring of the synchronisation device e.g. according to DE 694 06 413 T2 and Borg-Warner synchronisation does not comprise coupling elements or extensions projecting in axial direction or radial direction as stop faces for spring elements. Its end face pointing towards the synchronisation hub 2 is designed to be planar at least substantially.

Initiated by the axial displacement of the slip coupling sleeve 5, for example triggered by the shifting operation of a driver, in the friction package 6 a friction torque is generated via the cone rings 7, 8 by the displacement of the power assist element 11 in axial direction by sliding the function face 22 along the ramp/functional face 30 of the synchronization hub 2. Said friction torque acts via the inner cone ring 8 on the power assist element 11, so that the latter rotates and if necessary is tilted, as explained further below, and in this way the amplifying servo-power and if necessary lever action is generated. The synchronization ring 10 is axially displaced by the power assist element 11 also in shifting direction to the desired gear wheel g and rotated by sliding the toothing of the slip coupling on the ramps on the coupling teeth of the synchronization ring 10, until the latter reaches its synchronization position and the slip coupling 5 by overpressure of the spring force of the spring element 11 can produce the active connection with the desired gear wheel g. At the same time by means of the projections 9 of the outer cone ring 7 the coupling body c associated with the gear wheel g and thus the gear wheel g are rotated up to the coupling on the coupling side into the synchronization position.

The power assist element 11 according to the invention is moved in the gear-synchronisation device 1 in axial direction and circumferential direction, and there is no radial movement (with the exception of the spring element 12).

Figure 6:
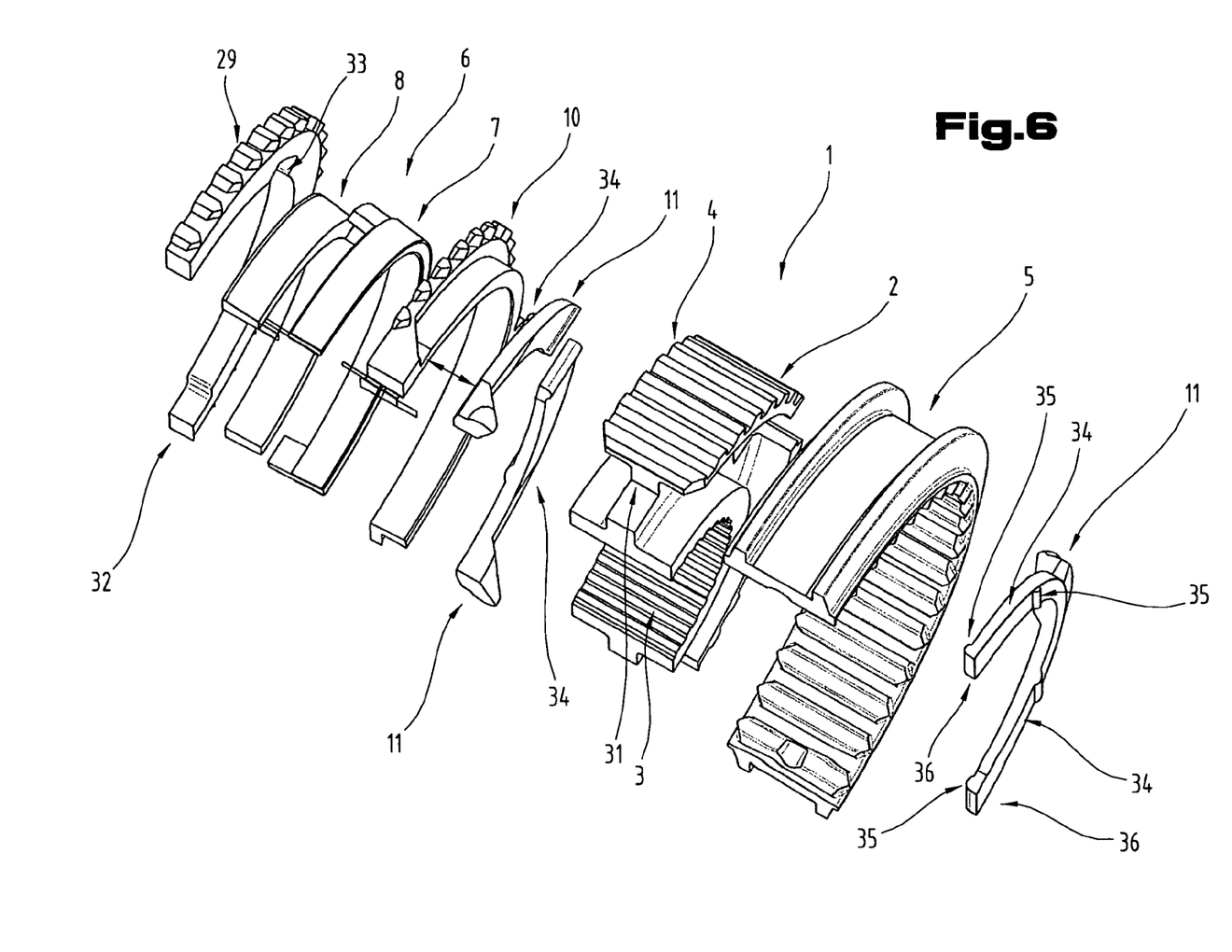
FIG. 6 shows a cut-out of a further embodiment variant of a gear synchronisation device according to the invention in an exploded view.
Figure 7:
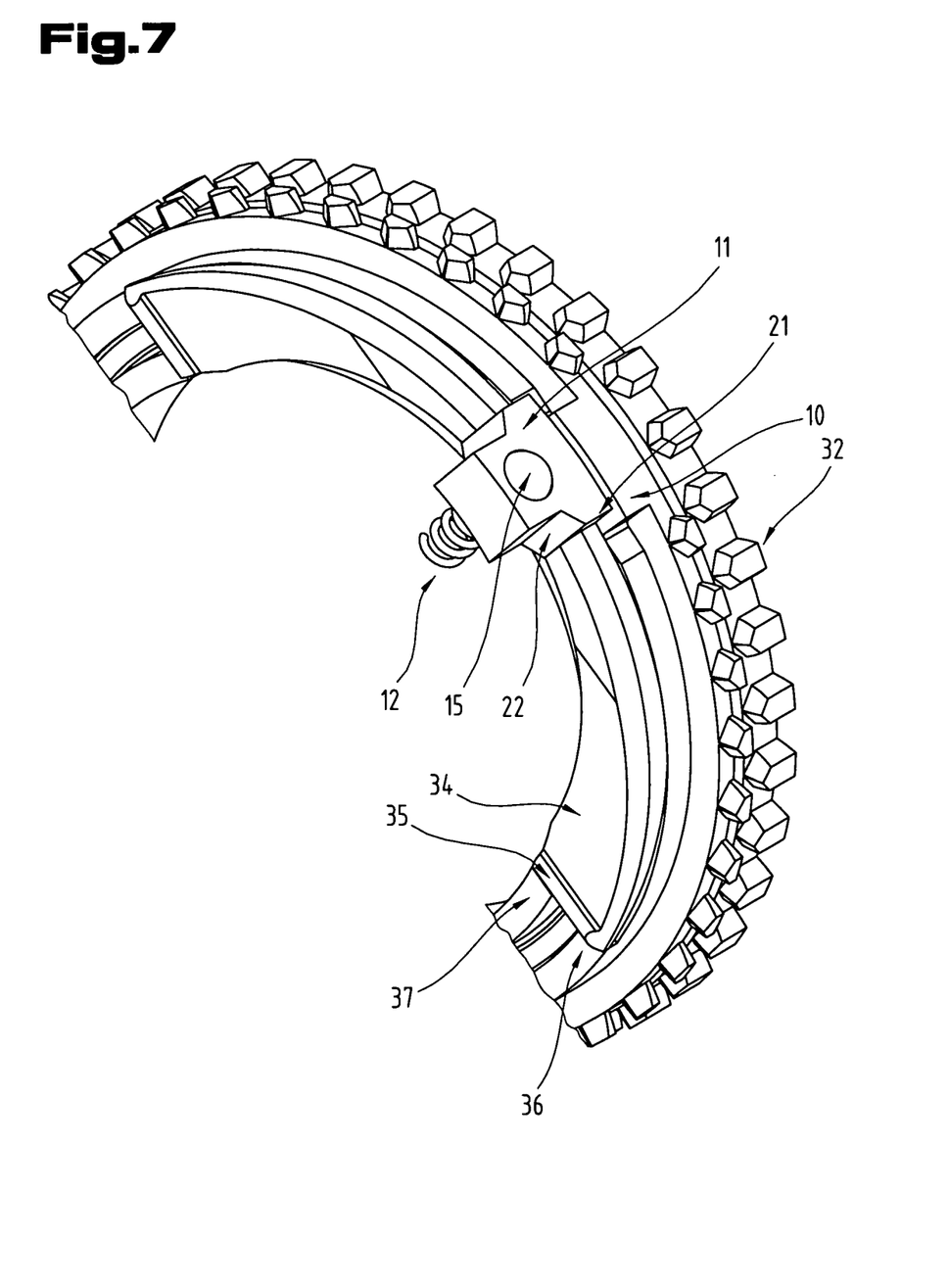
FIG. 7 shows a detail of the gear synchronisation device according to FIG. 6 in an embodiment variant of the power assist element.

FIGS. 6 and 7 shows an embodiment variant of the gear-synchronisation device 1, wherein the latter is shown in sections in an exploded view in FIG. 6, and FIG. 7 shows details of the power assist element 11 that are essential to the invention. Here the same parts are given the same reference numbers so as to correspond with the embodiments shown in FIGS. 1 to 5.

It should also be noted that in the Figures only a portion of a gear-synchronisation device 1 of a multiple gear changing transmission is shown for reasons of clarity, and only the elements essential for the invention are shown in order to explain their function. Reference is also made in this case to the relevant literature, e.g. relating to the Borg-Warner type. Generally, the power amplification can also be used for one-sided synchronisations.

In addition, FIG. 6 comprises a coupling body 32 of a recess 33, into which a projection 9 of the outer cone ring 7 of the friction packet 6 engages.

In this embodiment variant of the power assist element 11 the interruption of the aforementioned edge, which is formed by arranging the acute angle 23 between the greatest longitudinal extension 19 of the basic body 17 and the functional faces 22 (FIG. 5), is so wide that afterwards on the distal end sections 21 of the basic body 17 per functional area 22 a circular ring section-shaped lever element 34 is formed respectively. As can be seen in particular from FIG. 7, which shows a variant of the lever elements 34, the latter bears at least in sections on the friction package 6.

Said lever elements 34 can comprise respectively at least on the surface facing the synchronisation hub 2 at least one bead-like projection 35 in end sections 36 facing away from the basic body 17, or according to another embodiment variant can also comprise respectively at least one such bead-like projection on the rear side and further removed from the end sections 32 in the direction of the basic body 17. By means of said projections 31 in particular the tilting of the lever elements 34 and thus of the entire power assist element 11 is made easier, so that by means of the tilting a lever effect occurs, and in addition to amplification over the oblique functional faces 22 owing to a servoaction an amplification can be achieved due to the lever effect by means of said lever elements 34 of the applied axial force.

Said lever elements 34 extend until they bear against the projections 37 of the inner cone ring 8, wherein said projections (two per inner cone ring 8) can be arranged symmetrically opposite one another.

The projections 35 arranged in the end sections 36 of the lever elements 34 form the point for the introduction of torque into the power assist element 11, whereby the further bead-like projections on the rear side of the lever elements 34 facing the synchronization ring 10 can form the pressure point for further amplification force on the ring 10. As the power assist element 11 also comprises the oblique functional faces 22, the power amplification also occurs via the generated servo-power, as described above.

Figure 8:
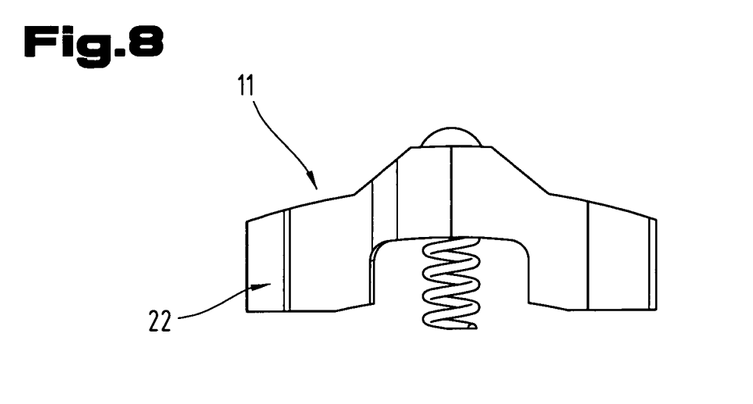
FIG. 8 shows another embodiment variant of a power assist element in side view.
Figure 9:
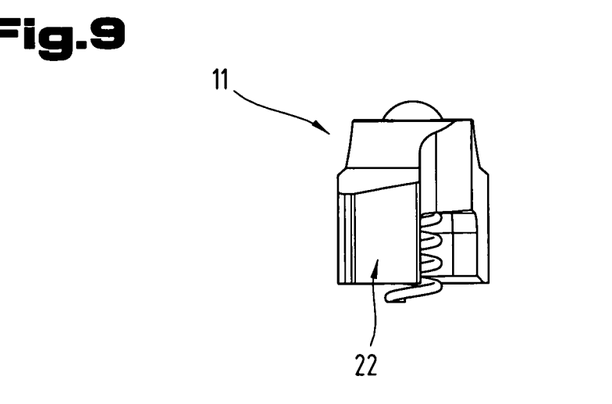
FIG. 9 shows the power assist element according to FIG. 8 in front view.
Figure 10:
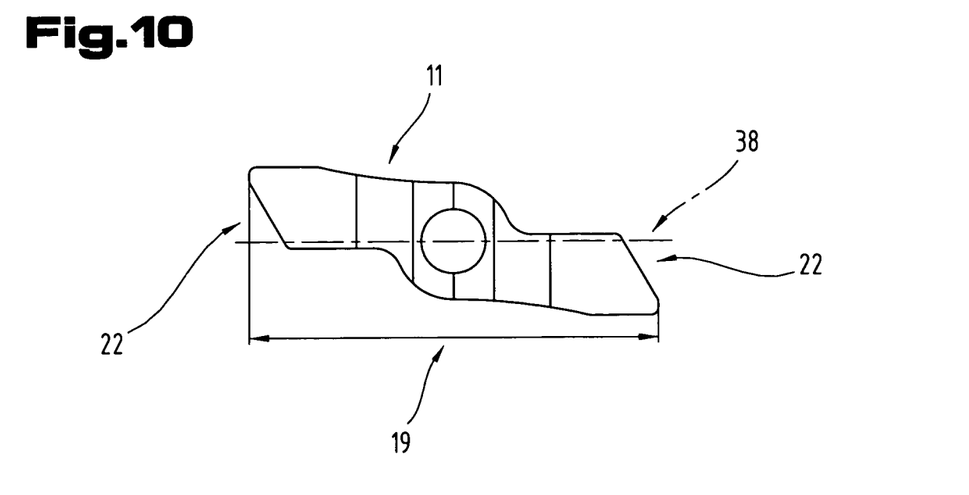
FIG. 10 shows the power assist element according to FIG. 8 in plan view.

FIGS. 8 to 10 show a different embodiment variant of the power assist element 11. The essential difference from the power assist element according to FIGS. 3 to 5 is that the two functional faces 22 are no longer inclined in opposite direction in relation to the longitudinal extension 19 but lie in the same direction and are arranged offset in relation to a longitudinal middle axis 38 in the direction of the longitudinal extension 19, as shown in particular in the plan view according to FIG. 10. The two functional faces 22 in this case run preferably at least approximately parallel to one another.

In principle for synchronisation in one direction only one of the functional faces 22 has to be provided, however the design according to FIGS. 8 to 10 has the advantage that the power assist element 11 can also be installed rotated by 180°, which in particular simplifies the assembly. Furthermore, with this embodiment variant a two-sided action of the power assist element 11 is possible, so that the latter operates not only in one shifting direction, as the power assist element 11 can be arranged centrally in the recess 25 of the synchronisation hub 2 with the longitudinal extension 19 in circumferential direction of the synchronisation hub 2.

The (two) functional face(s) 22 acts or act with one or both ramp(s) on the synchronisation hub 2, which is/are designed to be complementary to the functional faces 22, i.e. the functional face(s) 30 (FIG. 2) for power amplification.

As the power assist element 11 is otherwise similar to the power assist element 11 according to FIGS. 3 to 5, for further details and the principle mode of functioning reference is made to the above explanations.

In addition to the functional faces 22 the assist elements 11 have additional functional faces 39, 40 (FIG. 5 or FIG. 3), namely the engagement surfaces for the synchronization ring 10 (functional faces 39) on the two distal end sections 21 in connection with the functional faces 22, which form an acute angle 23 with the latter or according to the above embodiments only one of the latter, and due to the spring element 12 on the inner face of the end sections 21, which lies opposite said spring element 12. Between the functional faces 39 there is also the aforementioned free space in the power assist element 11 for the synchronization ring 10. The functional faces 40 act on the restoring of the power assist element 11.

The power assist element 11 thus comprises a maximum of only two functional faces 22, which cooperate with the ramp or ramps of the synchronisation hub 2.

FIG. 3 shows in a dashed line another embodiment variant of the power assist element 11, in which the trapezoidal elevation 27 is omitted. This has the disadvantage however that there are fewer gear teeth on the synchronisation hub 2.

Preferably, in all embodiment variants of the invention the power assist element 11 is not guided in the slip coupling 5. However, the bearing of the ball 15 as described above is not affected by this.

Owing to the fact that the power assist element 11 according to the invention is understood to be an intermediate element and only bears against the synchronisation ring 10, an improved restoring of the latter is achieved. The restoring is performed once the generated friction torque has become smaller again.

The exemplary embodiments show possible embodiment variants of the power assist element 11, whereby it should be noted at this point that the invention is not restricted to the embodiment variants shown in particular, but rather various different combinations of the individual embodiment variants are also possible and this variability, due to the teaching on technical procedure, lies within the ability of a person skilled in the art in this technical field.

Finally, as a point of formality, it should be noted that for a better understanding of the structure of the power assist element 11 the latter and its components have not been represented true to scale in part and/or have been enlarged and/or reduced in size.

The problem addressed by the independent solutions according to the invention can be taken from the description.

Figure 2:
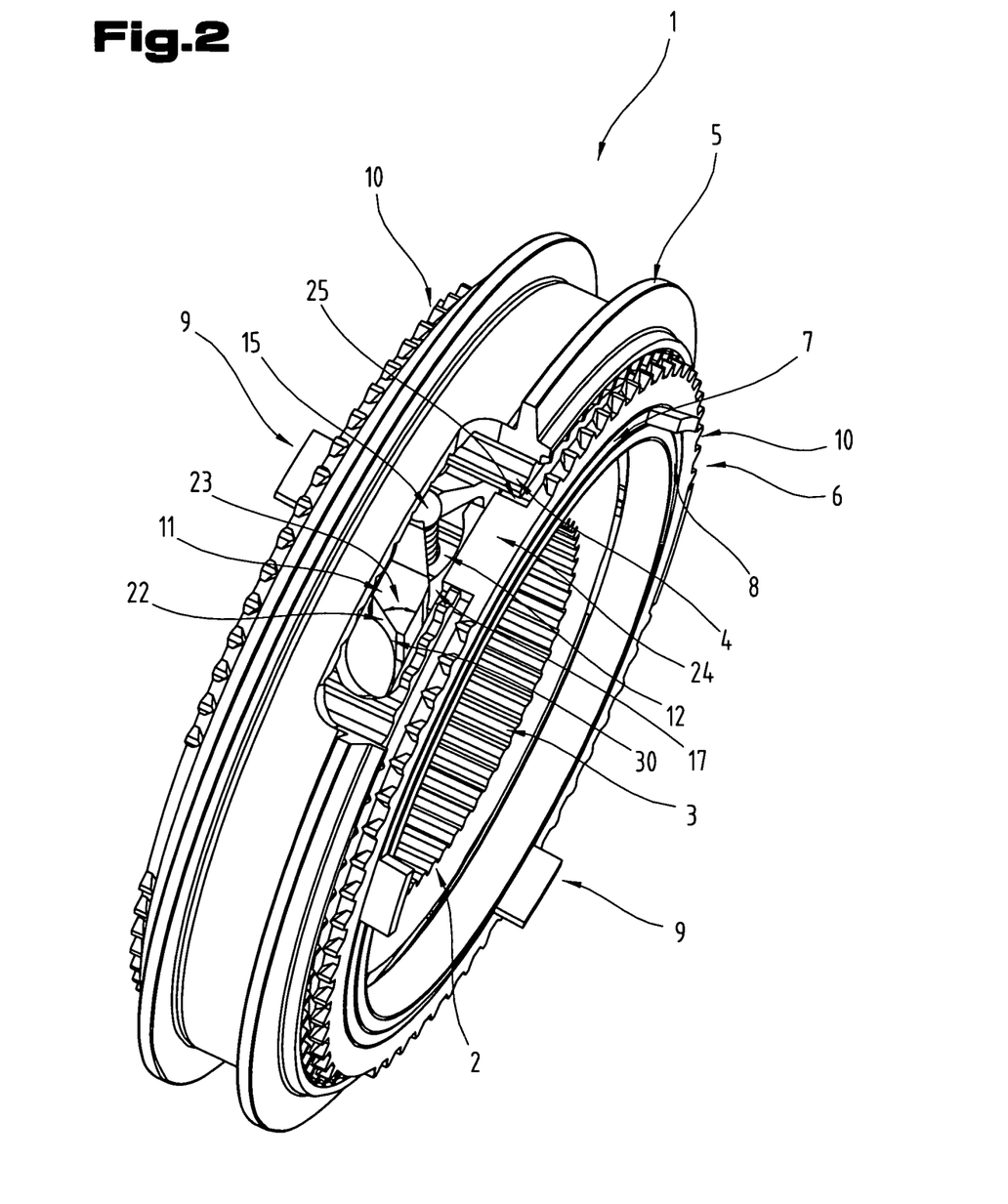
FIG. 2 shows the cut-out according to FIG. 1 in an oblique view partly in cross section.

Mainly, the individual embodiments shown in FIGS. 1, 2; 3; 4; 5; 7; 8, 9, 10 can form the subject matter of independent solutions according to the invention. The problems and solutions according to the invention relating thereto can be taken from the detailed descriptions of said figures.

LIST OF REFERENCE NUMERALS 1 gear-synchronisation device
2 synchronisation hub
3 insertion toothing
4 sleeve toothing
5 slip coupling
6 friction package
7 cone ring
8 cone ring
9 projection
10 synchronisation ring
11 power assist element
12 spring element
13 recess
14 recess
15 ball
16 recess
17 basic body
18 height
19 longitudinal extension
20 width extension
21 end section
22 functional face
23 angle
24 projection
25 recess
26 central area
27 elevation
28 ramp
29 end face
30 functional face
31 web
32 coupling body
33 recess
34 lever element
35 projection
36 end section
37 projection
38 longitudinal middle axis
39 functional face
40 functional face

The invention claimed is:

1. Gear-synchronization device with at least one synchronization hub arranged on a shaft, on which synchronization hub in opposite axial direction at least one synchronization ring is arranged, at least one gear wheel arranged on the shaft, at least one friction package, which is arranged underneath the synchronization ring and in active connection therewith, as well as at least one slip coupling arranged over the hub, wherein between the gear wheel and the synchronization ring a coupling body is arranged and wherein the synchronization hub comprises at least one recess, in which at least one spring-loaded power assist element is arranged, wherein the at least one power assist element has a basic body, which has a height measured in a radial direction and—as viewed in plan view—a longitudinal extension and a width extension measured in the axial direction, and the longitudinal extension is measured in the circumferential direction of the synchronization hub, is greater than the height or the width extension and has two distal end sections lying opposite one another in the direction of the longitudinal extension, on which respectively a functional face is formed, which cooperate in the installed position with the synchronization hub in the fitted state, wherein the functional faces are designed to be inclined in opposite direction, diametrically opposite one another, and relative to the longitudinal extension, or are offset along a longitudinal middle axis in the direction of the longitudinal extension of the basic body and are designed to be at least approximately parallel to one another, and wherein the functional faces are oriented respectively at an acute angle to the greatest longitudinal extension of the basic body, wherein the basic body has its greatest longitudinal extension on a rear side in the axial direction, wherein the at least one friction package comprises an outer cone ring and an inner cone ring, wherein on the cone rings on corresponding cooperating surfaces friction linings are provided, wherein the synchronization ring has a locking toothing on the outer circumference, and wherein the power assist element is coupled to the inner cone ring of the friction package and bears against the synchronization ring in a non-engaging manner.

2. Gear-synchronization device according to claim 1, wherein the angle of the at least one power assist element has an absolute value selected from a range with a lower limit of 10° and an upper limit of 89°.

3. Gear-synchronization device according to claim 1, wherein the functional faces of the at least one power assist element have a size, selected from a range with a lower limit of 10 mm² and an upper limit of 60 mm².

4. Gear-synchronization device according to claim 1, wherein a cross section of the basic body of the at least one power assist element is designed to be at least approximately u-shaped as seen in a direction perpendicular to the direction of the height.

5. Gear-synchronization device according to claim 1, wherein a central area of the basic body of the at least one power assist element is designed to be raised.

6. Gear-synchronization device according to claim 1, wherein at least one of the edges of the functional faces of the at least one power assist element is interrupted in the direction of the height.

7. Gear-synchronization device according to claim 1, wherein the synchronization hub has a sleeve toothing, which extends over a portion of an outer circumference and is interrupted by a plurality of the at least one recess extending underneath the sleeve toothing and in a region of the sleeve toothing, in which power assist elements are mounted, wherein the cross section of the recesses underneath the sleeve toothing is greater than the cross section of the recesses in the region of the sleeve toothing, so that the sleeve toothing extends partly into the region above the power assist elements mounted in the recesses.

8. Gear-synchronization device according to claim 7, wherein in the plurality of the at least one recess of the synchronization hub ramps with functional faces are arranged and the sleeve toothing extends over said ramps—as viewed in circumferential direction.

\* \* \* \* \*